United States Patent
Peng et al.

(10) Patent No.: US 11,047,477 B2
(45) Date of Patent: Jun. 29, 2021

(54) THREE-SECTION HYDRAULIC MECHANICAL STEPLESS TRANSMISSION DEVICE FOR LOADER

(71) Applicant: BEIJING INSTITUTE OF TECHNOLOGY, Beijing (CN)

(72) Inventors: Zengxiong Peng, Beijing (CN); Jibin Hu, Beijing (CN); Chongbo Jing, Beijing (CN); Wei Wu, Beijing (CN); Junjie Zhou, Beijing (CN); Chao Wei, Beijing (CN)

(73) Assignee: Beijing Institute of Technology, Beijing (CN)

( * ) Notice: Subject to any disclaimer, the term of this patent is extended or adjusted under 35 U.S.C. 154(b) by 3 days.

(21) Appl. No.: 16/476,684

(22) PCT Filed: Apr. 10, 2018

(86) PCT No.: PCT/CN2018/082413
§ 371 (c)(1),
(2) Date: Jan. 15, 2020

(87) PCT Pub. No.: WO2019/195993
PCT Pub. Date: Oct. 17, 2019

(65) Prior Publication Data
US 2020/0200266 A1    Jun. 25, 2020

(51) Int. Cl.
*F16H 47/02* (2006.01)
*F16H 47/04* (2006.01)
*F16H 61/70* (2006.01)
*F16H 61/66* (2006.01)

(52) U.S. Cl.
CPC ..... *F16H 61/705* (2013.01); *F16H 2061/6601* (2013.01); *F16H 2061/6604* (2013.01)

(58) Field of Classification Search
CPC ........... F16H 61/705; F16H 2061/6601; F16H 2061/6604; F16H 2047/025; F16H 2047/045
See application file for complete search history.

(56) References Cited

U.S. PATENT DOCUMENTS

| | | | | |
|---|---|---|---|---|
| 8,608,606 B2 * | 12/2013 | Fischer | ................... | F16H 47/04 475/80 |
| 9,482,331 B2 * | 11/2016 | Schindler | ................ | F16H 47/08 |
| 9,810,305 B2 * | 11/2017 | Legner | .................. | F16H 61/421 |
| 2019/0271382 A1 * | 9/2019 | Seipold | ................. | F16H 37/084 |

* cited by examiner

*Primary Examiner* — Tisha D Lewis
(74) *Attorney, Agent, or Firm* — Avant Law Group, LLC

(57) ABSTRACT

Some embodiments of the disclosure provide a three-section hydraulic mechanical compound stepless transmission device which utilizes the compounding of a hydraulic speed control circuit and a mechanical circuit. According to an embodiment, a three-section hydraulic mechanical stepless transmission device for a loader includes a casing, a hydraulic speed control circuit, an ahead and astern mechanism, a split-collecting mechanism, a hydraulic section fixed shaft gear transmission system, a first hydraulic mechanical section fixed shaft gear transmission system, a second hydraulic mechanical section fixed shaft gear transmission system, and an output portion. According to another embodiment, the three-section hydraulic mechanical compound stepless transmission device includes a hydraulic circuit which transmits only part of power.

6 Claims, 6 Drawing Sheets

THREE-SECTION HYDRAULIC MECHANICAL STEPLESS TRANSMISSION DEVICE FOR LOADER

CROSS REFERENCE TO RELATED APPLICATIONS

This application is the United States national stage entry under 35 U.S.C. 371 of PCT/CN2018/082413 filed on Apr. 10, 2018, the disclosure of which is incorporated by reference herein in its entirety.

FIELD OF THE DISCLOSURE

The disclosure relates generally to the field of transmission devices. More specifically, the disclosure relates to a three-section hydraulic mechanical stepless transmission device for a loader.

BACKGROUND

A machinery loader generally adopts a hydraulic mechanical power shift gearbox. Due to the need of the loading operation, the vehicle speed and the engine load change drastically, and the torque converter efficiency is low, resulting in the highest transmission efficiency of a transmission system is about 75%.

Hydrostatic transmission can easily realize stepless speed regulation, so that a loader engine often operates in an economical rotating speed range, which can improve the energy utilization efficiency of a whole vehicle. However, the efficiency of a closed speed control circuit of a hydraulic pump variable motor used for hydrostatic transmission is also lower, so the potential for promotion of hydrostatic transmission is limited compared with that of a power shift hydraulic mechanical gearbox.

The hydraulic mechanical transmission can realize high-efficiency stepless transmission through the compounding of mechanical power and hydraulic power, so that the engine maintains a stable load and improves fuel economy. The hydraulic mechanical transmission has become one of the development directions of a loader transmission system, and domestic and foreign construction machinery manufacturers are actively studying the transmission system.

Caterpillar Inc.'s patents CN104136812 A, CN104136813 A, and US 2006/0276291 A1 disclose a multi-gear hydraulic mechanical transmission for a loader. The multi-gear hydraulic mechanical transmission includes two continuously variable-speed hydraulic mechanical sections and one high-speed hydraulic mechanical section, where the two continuously variable-speed hydraulic mechanical sections are used for starting and low speed operations, respectively, and the high-speed hydraulic mechanical section is used for walking transitions. Due to the two-way compounding of hydraulic mechanical power, a hydraulic circuit only transmits part of the power, so the transmission efficiency is greatly improved compared with that of a hydraulic mechanical power shift gearbox. However, the ahead and astern conversion requires clutch switching, and the manipulation is slightly complicated.

ZF Company U.S. Pat. No. 8,328,676 B2 discloses a hydraulic mechanical transmission device for a loader. The hydraulic mechanical transmission device adopts two or three hydraulic mechanical sections and adopts a power split form of input split and compound split, so the transmission efficiency is higher, but the power of required hydraulic elements is greater.

Dana Rexroth Company's patent US 2014/0305113 A1 discloses a two-section hydraulic mechanical transmission device, which starts in a pure hydraulic section and operates and walks in a hydraulic mechanical section. Dana Rexroth Company's patent EP 2 280 192 B1 discloses a three-section hydraulic mechanical transmission device, which starts in a pure hydraulic section, and two hydraulic mechanical sections are used for operation and walking, respectively, so that higher transmission efficiency can be achieved

SUMMARY

The following presents a simplified summary of the invention in order to provide a basic understanding of some aspects of the invention. This summary is not an extensive overview of the invention. It is not intended to identify critical elements or to delineate the scope of the invention. Its sole purpose is to present some concepts of the invention in a simplified form as a prelude to the more detailed description that is presented elsewhere.

In some embodiments, the disclosure provides a three-section hydraulic mechanical compound stepless transmission device which utilizes the compounding of a hydraulic speed control circuit and a mechanical circuit. The hydraulic circuit transmits only part of the available power.

In other embodiments, the disclosure provides a three-section hydraulic mechanical stepless transmission device for a loader. The three-section hydraulic mechanical stepless transmission device includes a casing, a hydraulic speed control circuit, an ahead and astern mechanism, a split-collecting mechanism, a hydraulic section fixed shaft gear transmission system, a first hydraulic mechanical section fixed shaft gear transmission system, a second hydraulic mechanical section fixed shaft gear transmission system, and an output portion.

Optionally, the hydraulic speed control circuit includes a hydraulic pump, a slippage pump, and a variable motor.

Optionally, the ahead and astern mechanism includes a main input shaft, a fourth gear, a seventh gear, a ninth gear, a tenth gear, a twelfth gear, a first clutch (also known as a first KV clutch), and a second clutch (also known as a first KR clutch).

Optionally, the split-collecting mechanism includes a first planet carrier, a twenty-third gear, a twenty-first gear ring, a second planet carrier, a second sun wheel, and a nineteenth gear.

Optionally, the hydraulic section fixed shaft gear transmission system includes a third clutch (also known as a first K1 clutch), a twenty-seventh gear, and a twenty-ninth gear.

Optionally, the first hydraulic mechanical section fixed shaft gear transmission system includes a fourth clutch (also known as a first K2 clutch).

Optionally, the second hydraulic mechanical section fixed shaft gear transmission system includes a fifth clutch (also known as a first K3 clutch).

Optionally, the output portion includes a twenty-fourth gear, a twenty-fifth gear, a thirtieth gear, and a main output shaft.

Optionally, the main input shaft is movably connected with the casing, the fourth gear and the second clutch are fixedly disposed on a portion of the main input shaft located inside the casing, the ninth gear is rotatably disposed on the portion of the main input shaft located inside the casing, the driving end of the second clutch is in power connection with the ninth gear, and an end portion of the main input shaft is in power connection with the slippage pump.

Optionally, a power input shaft of the hydraulic pump is movably connected with the casing. A fifth gear is fixedly disposed on a portion of the power input shaft of the hydraulic pump located inside the casing. The fifth gear is meshed with the fourth gear.

Optionally, the first planet carrier is fixedly disposed at an end portion of a first half shaft, the other end of the first half shaft is movably connected with the casing, and a plurality of first planet gears are disposed on the first planet carrier. The first clutch and the twelfth gear are fixedly disposed on the first half shaft, the seventh gear is rotatably disposed on the first half shaft, the seventh gear is meshed with the fourth gear, the twelfth gear is in power connection with the ninth gear through the tenth gear. The driving end of the first clutch is in power connection with the seventh gear.

Optionally, the three-section hydraulic mechanical stepless transmission device further includes a fourteenth gear. The fourteenth gear is fixedly disposed at the end of a second half shaft. The other end of the second half shaft is movably connected with the casing.

Optionally, the fourteenth gear is meshed with the plurality of first planet gears, the second sun wheel and the fifth clutch are fixedly disposed on the second half shaft. The nineteenth gear is rotatably disposed on the second half shaft.

Optionally, the plurality of first planet gears are meshed with a fifteenth gear ring, the fifteenth gear ring is fixedly connected with the second planet carrier, the second planet carrier is rotatably connected with one side of each of a plurality of second planet gears, the other side of each of the plurality of second planet gears is rotatably connected with the driven end of the fourth clutch. The plurality of second planet gears are meshed with internal teeth of the twenty-first gear ring.

Optionally, the nineteenth gear is in power connection with the fifth clutch and the driving end of the fourth clutch.

Optionally, the twenty-fifth gear is fixedly disposed on a first intermediate shaft. The first intermediate shaft is movably connected with the casing. The twenty-fifth gear is in power connection with the nineteenth gear through the twenty-fourth gear.

Optionally, the third clutch is fixedly disposed on the first intermediate shaft, the twenty-seventh gear is rotatably disposed on the first intermediate shaft. The driven end of the third clutch is in power connection with the twenty-seventh gear.

Optionally, the twenty-seventh gear is meshed with external teeth of the twenty-first gear ring.

Optionally, the main output shaft is movably connected with the casing. The thirtieth gear is fixedly disposed on the main output shaft. The thirtieth gear is meshed with the twenty-fifth gear.

Optionally, a power input shaft of the variable motor is movably connected with the casing, the twenty-ninth gear is fixedly disposed on a portion of the power input shaft of the variable motor located inside the casing. The twenty-ninth gear is meshed with the twenty-seventh gear. The variable motor and the hydraulic pump form a closed hydraulic circuit.

Optionally, the hydraulic section fixed shaft gear transmission system further includes a twenty-second gear and a thirty-second gear. The twenty-second gear is fixedly disposed on a second intermediate shaft. The second intermediate shaft is movably connected with the casing. The twenty-second gear is meshed with external teeth of the twenty-first gear ring. The thirty-second gear is fixedly disposed on a portion of the power input shaft of the variable motor located inside the casing. The thirty-second gear is meshed with the twenty-second gear.

Optionally, the twenty-fourth gear is rotatably disposed on the second intermediate shaft.

Optionally, the fifteenth gear ring is fixedly disposed at an end portion of a first half shaft, the other end of the first half shaft is movably connected with the casing, the first planet carrier is fixedly disposed at the end of a third half shaft, the other end of the third half shaft is movably connected with the casing. The first half shaft and the third half shaft are coaxially disposed. The first planet carrier is provided with a plurality of first planet gears. The plurality of first planet gears are meshed with the fifteenth gear ring.

Optionally, the three-section hydraulic mechanical stepless transmission device further includes a fourteenth gear. The fourteenth gear is rotatably disposed on the third half shaft. The fourteenth gear is coaxially fixedly connected with the twenty-third gear. The fourteenth gear is meshed with a plurality of first planet gears. The twenty-third gear is coaxially fixedly connected with the twenty-first gear ring.

Optionally, the second sun wheel, the fifth clutch, and the nineteenth gear are rotatably disposed on the third half shaft.

Optionally, the second planet carrier is fixedly disposed on the third half shaft, the second planet carrier is rotatably connected with one side of each of a plurality of second planet gears. The other side of each of the plurality of second planet gears is rotatably connected with the driven end of the fourth clutch. The nineteenth gear is in power connection with the fifth clutch and the driving end of the fourth clutch.

Optionally, the hydraulic section fixed shaft gear transmission system further includes a twenty-second gear and a thirty-second gear.

Optionally, the twenty-second gear is fixedly disposed on a second intermediate shaft. The second intermediate shaft is movably connected with the casing. The twenty-second gear is meshed with the twenty-third gear.

Optionally, the thirty-second gear is fixedly disposed on a portion of the power input shaft of the variable motor located inside the casing. The thirty-second gear is meshed with the twenty-second gear.

Optionally, the twenty-fourth gear is rotatably disposed on the second intermediate shaft.

DETAILED DESCRIPTION

The following describes some exemplary embodiments of the disclosure with reference to the accompanying drawings.

The described embodiments are merely a part rather than all of the embodiments of the disclosure. All other embodiments obtained by a person of ordinary skill in the art without creative efforts on the basis of the embodiments of the disclosure shall fall within the scope of protection of the disclosure. In FIGS. 1 and 6-8, 1 represents casing, 2 represents hydraulic pump, 3 represents slippage pump, 4 represents fourth gear, 5 represents fifth gear, 6 represents second clutch, 7 represents seventh gear, 8 represents main input shaft, 9 represents ninth gear, 10 represents tenth gear, 11 represents first clutch, 12 represents twelfth gear, 13 represents first planet carrier, 14 represents fourteenth gear, 15 represents fifteenth gear ring, 16 represents second planet carrier, 17 represents second sun wheel, 18 represents fourth clutch, 19 represents nineteenth gear, 20 represents fifth clutch, 21 represents twenty-first gear ring, 22 represents twenty-second gear, 23 represents twenty-third gear, 24 represents twenty-fourth gear, 25 represents twenty-fifth gear, 26 represents third clutch, 27 represents twenty-seventh gear, 28 represents variable motor, 29 represents twenty-ninth gear, 30 represents thirtieth gear, 31 represents main output shaft, and 32 represents thirty-second gear.

Embodiment 1

Figure 1:
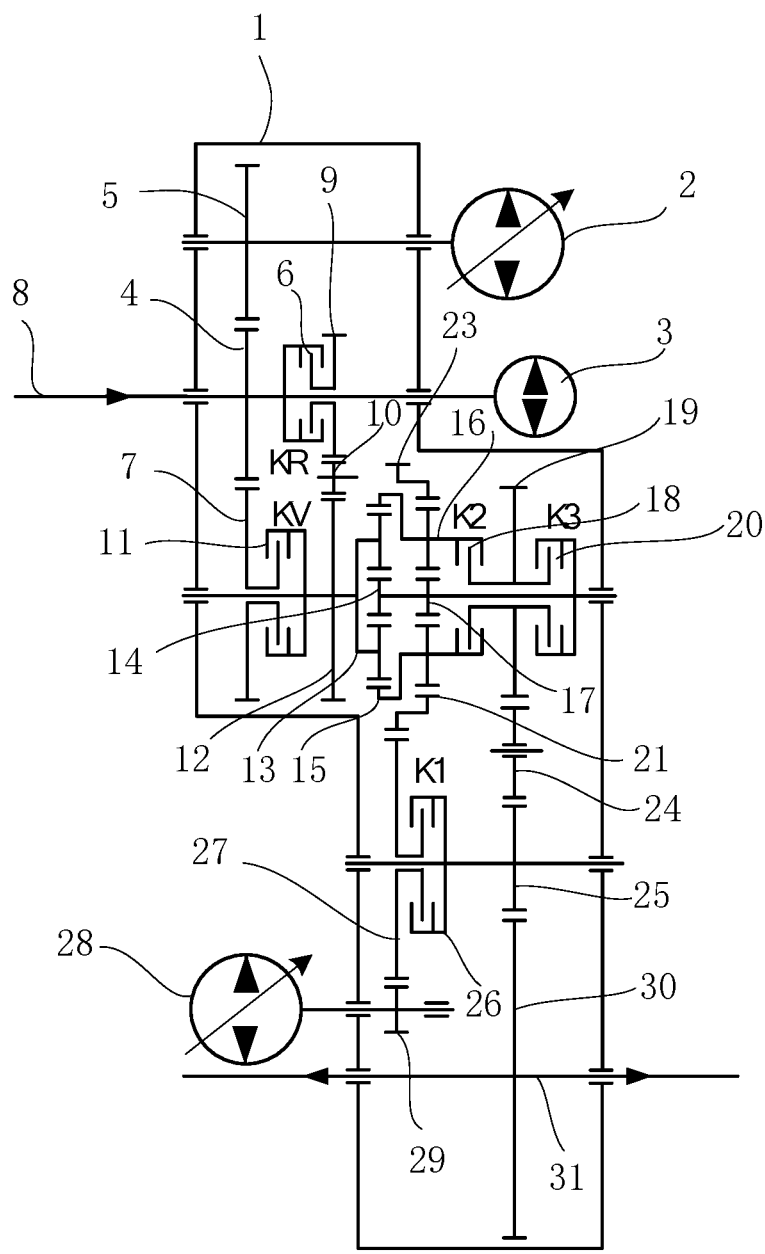
FIG. 1 is a transmission diagram of a three-section hydraulic mechanical compound stepless transmission device.

As shown in FIG. 1, a three-section hydraulic mechanical stepless transmission device for a loader in this embodiment includes a casing 1, a hydraulic speed control circuit, an ahead and astern mechanism, a split-collecting mechanism, a hydraulic section fixed shaft gear transmission system, a first hydraulic mechanical section fixed shaft gear transmission system, a second hydraulic mechanical section fixed shaft gear transmission system and an output portion. The hydraulic speed control circuit includes a hydraulic pump 2, a slippage pump 3 and a variable motor 28. The ahead and astern mechanism includes a main input shaft 8, a fourth gear 4, a seventh gear 7, a ninth gear 9, a tenth gear 10, a twelfth gear 12, a first clutch 11 and a second clutch 6. The split-collecting mechanism includes a first planet carrier 13, a twenty-third gear 23, a twenty-first gear ring 21, a second planet carrier 16, a second sun wheel 17 and a nineteenth gear 19. The hydraulic section fixed shaft gear transmission system includes a third clutch 26, a twenty-seventh gear 27, and a twenty-ninth gear 29. The first hydraulic mechanical section fixed shaft gear transmission system includes a fourth clutch 18. The second hydraulic mechanical section fixed shaft gear transmission system includes a fifth clutch 20. The output portion includes a twenty-fourth gear 24, a twenty-fifth gear 25, a thirtieth gear 30, and a main output shaft 31. The main input shaft 8 is movably connected with the casing 1, the fourth gear 4 and the second clutch 6 are fixedly disposed on a portion of the main input shaft 8 located inside the casing 1, the ninth gear 9 is rotatably disposed on the portion of the main input shaft 8 located inside the casing 1, the driving end of the second clutch 6 is in power connection with the ninth gear 9, and an end portion of the main input shaft 8 is in power connection with the slippage pump 3. A power input shaft of the hydraulic pump 2 is movably connected with the casing 1, a fifth gear 5 is fixedly disposed on a portion of the power input shaft of the hydraulic pump 2 located inside the casing 1. The fifth gear 5 is meshed with the fourth gear 4. The first planet carrier 13 is fixedly disposed at an end portion of a first half shaft, the other end of the first half shaft is movably connected with the casing 1, and a plurality of first planet gears are disposed on the first planet carrier 13. The first clutch 11 and the twelfth gear 12 are fixedly disposed on the first half shaft, the seventh gear 7 is rotatably disposed on the first half shaft, the seventh gear 7 is meshed with the fourth gear 4, the twelfth gear 12 is in power connection with the ninth gear 9 through the tenth gear 10. The driving end of the first clutch 11 is in power connection with the seventh gear 7. The three-section hydraulic mechanical stepless transmission device further includes a fourteenth gear 14. The fourteenth gear 14 is fixedly disposed at the end of a second half shaft. The other end of the second half shaft is movably connected with the casing 1. The fourteenth gear 14 is meshed with the plurality of first planet gears, the second sun wheel 17 and the fifth clutch 20 are fixedly disposed on the second half shaft. The nineteenth gear 19 is rotatably disposed on the second half shaft. The plurality of first planet gears are meshed with a fifteenth gear ring 15, the fifteenth gear ring 15 is fixedly connected with the second planet carrier 16, the second planet carrier 16 is rotatably connected with one side of each of a plurality of second planet gears, the other side of each of the plurality of second planet gears is rotatably connected with the driven end of the fourth clutch 18. The plurality of second planet gears are meshed with internal teeth of the twenty-first gear ring 21. The nineteenth gear 19 is in power connection with the fifth clutch 20 and the driving end of the fourth clutch 18.

The twenty-fifth gear 25 is fixedly disposed on a first intermediate shaft. The first intermediate shaft is movably connected with the casing 1. The twenty-fifth gear 25 is in power connection with the nineteenth gear 19 through the twenty-fourth gear 24. The third clutch 26 is fixedly disposed on the first intermediate shaft, the twenty-seventh gear 27 is rotatably disposed on the first intermediate shaft. The driven end of the third clutch 26 is in power connection with the twenty-seventh gear 27. The twenty-seventh gear 27 is meshed with external teeth of the twenty-first gear ring 21.

The main output shaft 31 is movably connected with the casing 1. The thirtieth gear 30 is fixedly disposed on the main output shaft 31. The thirtieth gear 30 is meshed with the twenty-fifth gear 25. A power input shaft of the variable motor 28 is movably connected with the casing 1, the twenty-ninth gear 29 is fixedly disposed on a portion of the power input shaft of the variable motor 28 located inside the casing 1. The twenty-ninth gear 29 is meshed with the twenty-seventh gear 27. The variable motor 28 and the hydraulic pump 2 form a closed hydraulic circuit.

In the three-section hydraulic mechanical stepless transmission device for the loader, the gear-shifting logic is as shown in the following table (indicating the operating elements that need to be engaged in each section):

| | | |
|---|---|---|
| Advance | First section | K1 K2 |
| | Second section | KV K2 |
| | Third section | KV K3 |
| Back | First section | K1 K2 |
| | Second section | KR K2 |
| | Third section | KR K3 |

Taking the advancement of the loader as an example, the working principle of the three-section hydraulic mechanical stepless transmission device for the loader according to an embodiment of the disclosure is further explained:

The first section is a pure hydraulic section. The third clutch 26 and the fourth clutch 18 are both in an engaged state. At this time, the engine input power is transmitted to the hydraulic pump 2 through the main input shaft 8, the fourth gear 4, and the fifth gear 5. The power output from the hydraulic pump 2 is transmitted to the twenty-ninth gear 29 and the twenty-seventh gear 27 after passing through the variable motor 28. On the one hand, the twenty-seventh gear 27 drives the first intermediate shaft to rotate. The twenty-fifth gear 25 fixedly disposed on the first intermediate shaft transmits power to the thirtieth gear 30. Then, the power is output from the main output shaft 31, and the loader starts. On the other hand, the twenty-seventh gear 27 drives the twenty-third gear 23 and the twenty-first gear ring 21 to rotate, the twenty-first gear ring 21 transmits power to the second planet carrier 16 to drive the second planet gears, the power is transmitted to the nineteenth gear 19 through the fourth clutch 18. The nineteenth gear 19 transmits the power to the twenty-fourth gear 24, the twenty-fifth gear 25 and the thirtieth gear 30, to transmit the power to the main output shaft 31, so as to ensure that the power on the main output shaft 31 is not interrupted in the gear-shifting process.

The second section is a first hydraulic mechanical section. The first clutch 11 and the fourth clutch 18 are both in an engaged state. On the one hand, the engine input power is transmitted to the hydraulic pump 2 through the main input shaft 8, the fourth gear 4 and the fifth gear 5, and after the power output by the hydraulic pump 2 passes through the variable motor 28, the power is transmitted to the twenty-ninth gear 29 and the twenty-seventh gear 27. On the other hand, the engine input power is transmitted to the first half shaft through the main input shaft 8, the fourth gear 4, the seventh gear 7 and the first clutch 11. Then the power is transmitted to the fourth clutch 18 through the first planet carrier 13 and the fifteenth gear ring 15. The power is transmitted to the nineteenth gear 19 through the fourth clutch 18. The nineteenth gear 19 transmits the power to the twenty-fourth gear 24, the twenty-fifth gear 25 and the thirtieth gear 30, to transmit the power to the main output shaft 31, so as to ensure that the power on the main output shaft 31 is not interrupted in the gear-shifting process.

Since the first planet carrier 13, the first planet gears and the fourteenth gear 14 may eliminate the differential between the first clutch 11 and the fourth clutch 18. The second planet carrier 16, the second planet gears and the sun second wheel 17 may eliminate the differential between the third clutch 26 and the fourth clutch 18, in the process of switching the gear from the first section to the second section, the first clutch 11 may be first engaged and then the third clutch 26 is released, thereby ensuring uninterrupted output of power to improve work efficiency.

The third section is a second hydraulic mechanical section. The first clutch 11 and the fifth clutch 20 are both in an engaged state. The input power of the engine is transmitted to the second half shaft through the main input shaft 8, the fourth gear 4, the seventh gear 7, the first clutch 11, the first planet carrier 13, the first planet gears and the fourteenth gear 14 to drive the fifth clutch 20, the fifth clutch 20 is engaged to transmit the power to the nineteenth gear 19. Then the power is transmitted to the main output shaft 31 through the twenty-fourth gear 24, the twenty-fifth gear 25 and the thirtieth gear 30.

The first section is purely hydraulic for starting and low-speed vehicle backing.

Advancing and vehicle backing switching does not require a clutch, and it is only necessary to change the direction of a variable of the hydraulic pump 2 to achieve smooth switching.

The second and third sections are hydraulic mechanical sections, the second section is used for low-speed operation working conditions. The third section is used for high-speed driving, which ensures high efficiency and low fuel consumption during the transition and improves transmission efficiency compared with a conventional hydraulic mechanical power shift gearbox.

Figure 2:
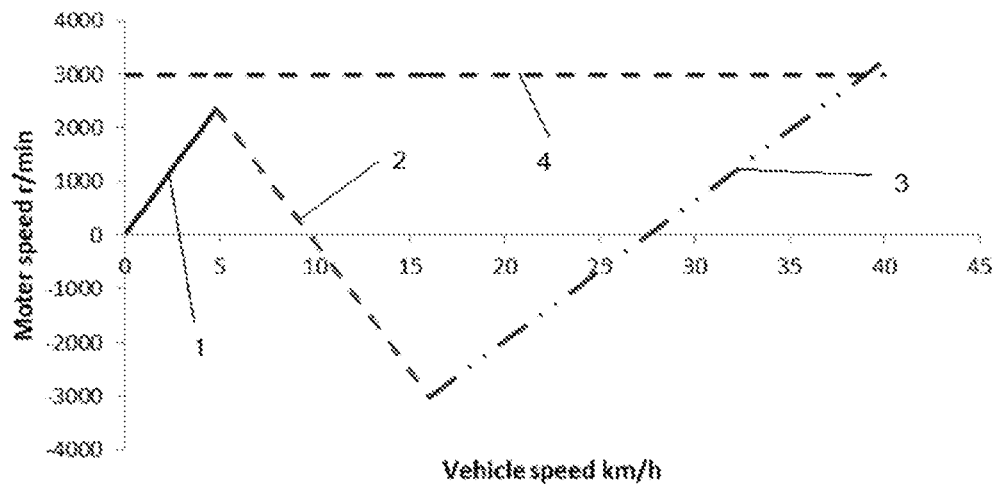
FIG. 2 is a rotational speed diagram of a hydraulic pump and a variable motor.

FIG. 2 is a rotational speed diagram of the hydraulic pump 2 and the variable motor 28. In the figure, a curve 1 shows the rotating speed of the pure hydraulic section variable motor 28, a curve 2 shows the rotating speed of the first hydraulic mechanical section variable motor 28, a curve 3 shows the rotating speed of the second hydraulic mechanical section variable motor 28, and a curve 4 shows the rotating speed of the hydraulic pump 2.

Figure 3:
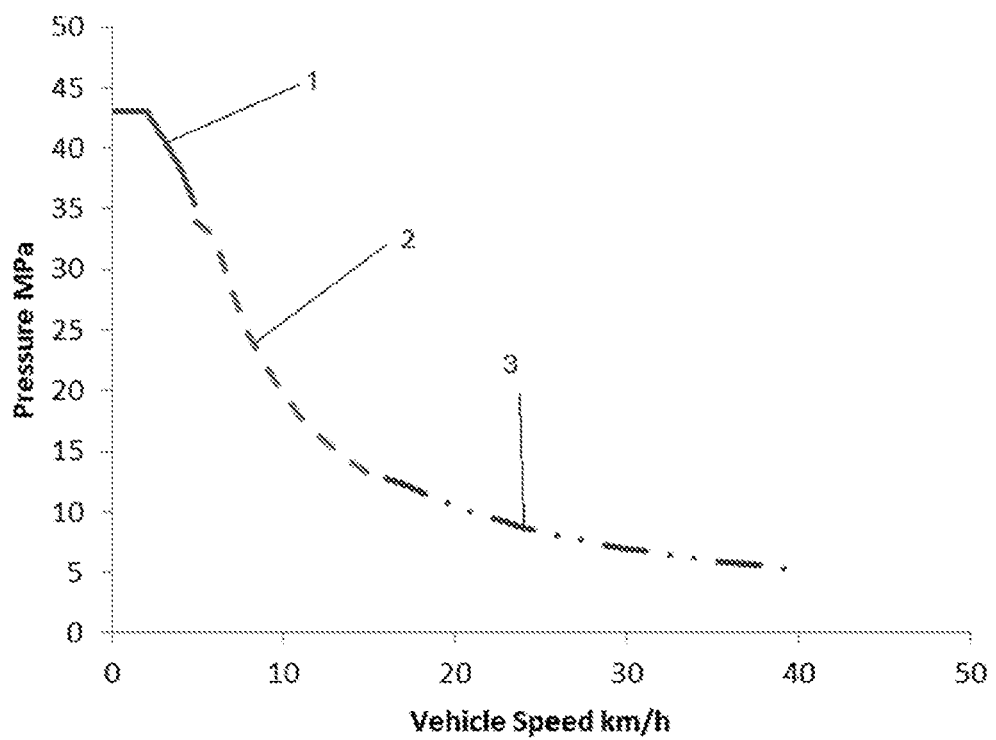
FIG. 3 is a maximum pressure diagram of a hydraulic pump.

FIG. 3 is a maximum pressure diagram of the hydraulic pump 2. In the figure, a curve 1 represents the working pressure of the hydraulic pump 2 of the pure hydraulic section, a curve 2 represents the working pressure of the hydraulic pump 2 in the first hydraulic mechanical section, and a curve 3 represents the working pressure of the hydraulic pump 2 in the second hydraulic mechanical section.

Figure 4:
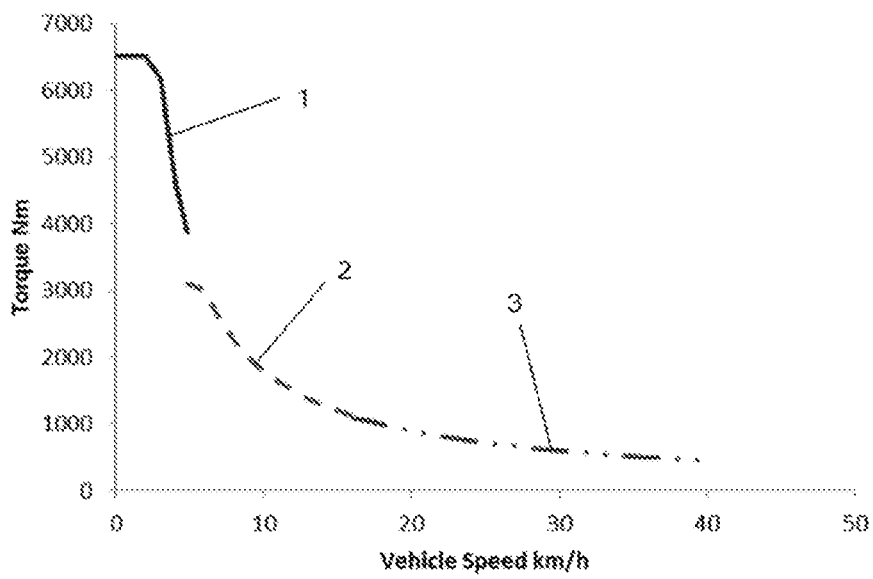
FIG. 4 is a diagram showing the maximum output torque.

FIG. 4 is a maximum output torque diagram, a curve 1 represents the maximum output torque of the pure hydraulic section, a curve 2 represents the maximum output torque of the first hydraulic mechanical section, and a curve 3 represents the maximum output torque of the second hydraulic mechanical section.

Figure 5:
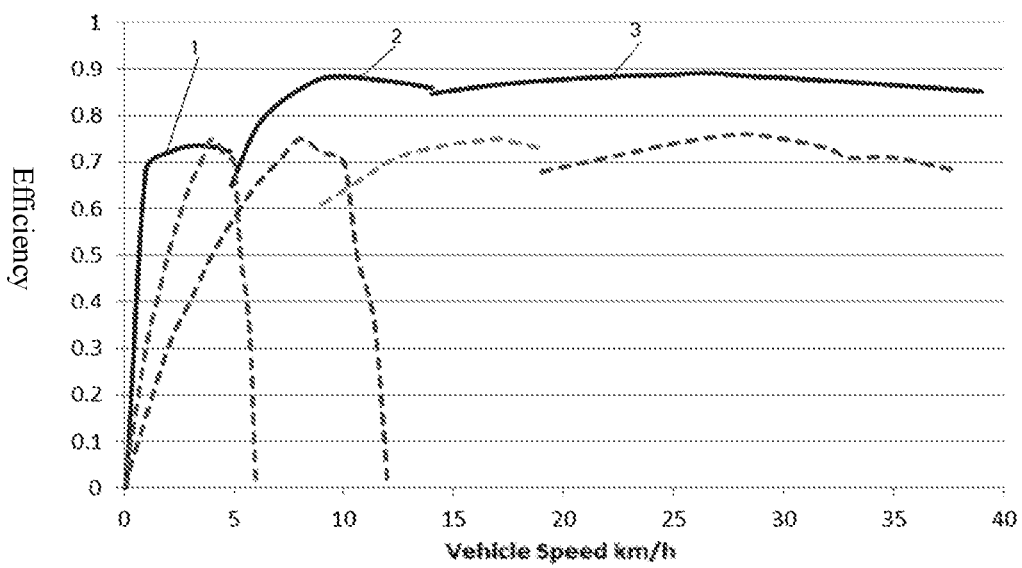
FIG. 5 is an efficiency diagram.

FIG. 5 is an efficiency diagram, a solid line 1 is an efficiency curve of the pure hydraulic section, a solid line 2 is an efficiency curve of the first hydraulic mechanical section, a solid line 3 is an efficiency curve of the second hydraulic mechanical section, and a dotted line is an efficiency curve of a conventional hydraulic mechanical power shift gearbox of a loader.

Embodiment 2

This embodiment is an improved embodiment based on the Embodiment 1.

Figure 6:
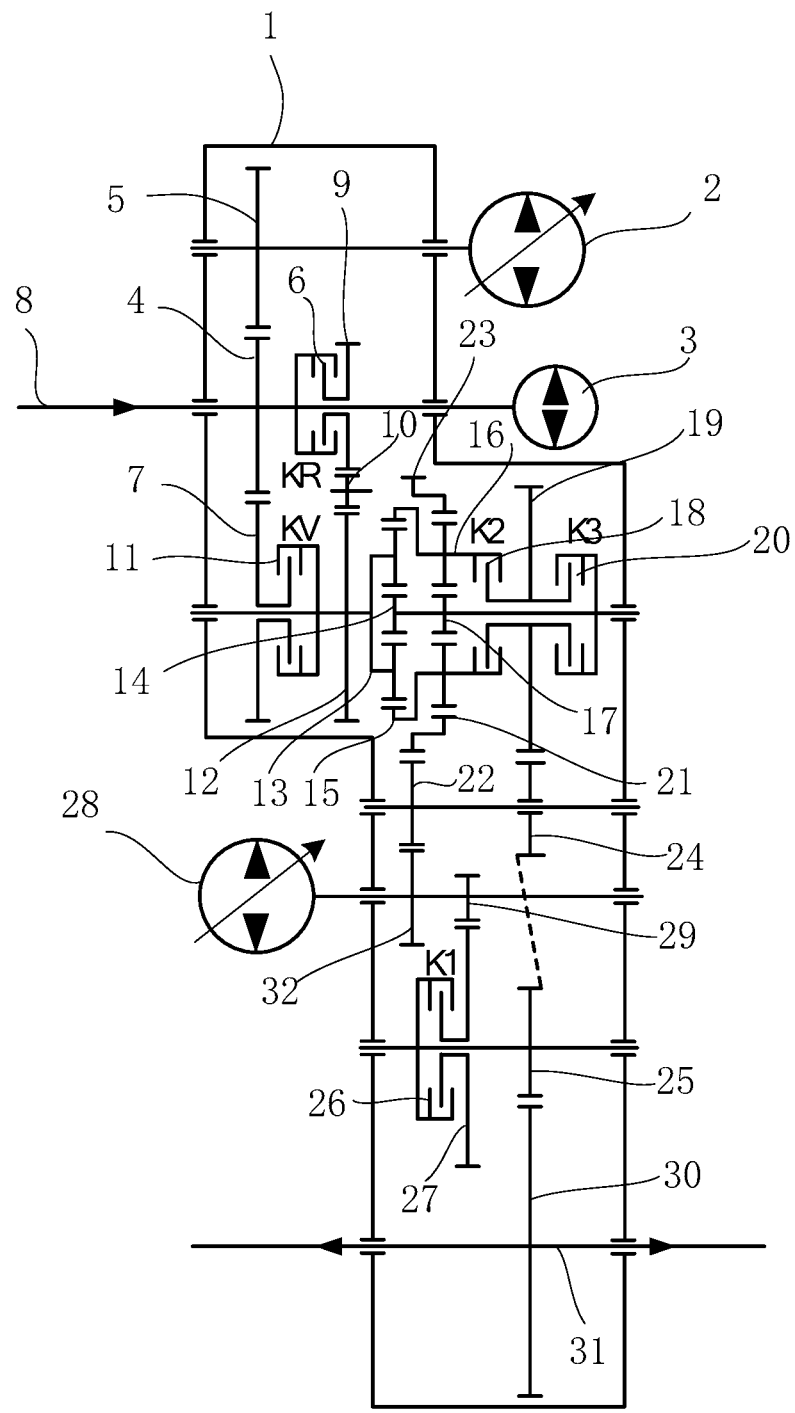
FIG. 6 is a second transmission diagram of a three-section hydraulic mechanical compound stepless transmission device.

As shown in FIG. 6, a three-section hydraulic mechanical stepless transmission device for a loader in this embodiment includes a casing 1, a hydraulic speed control circuit, an ahead and astern mechanism, a split-collecting mechanism, a hydraulic section fixed shaft gear transmission system, a first hydraulic mechanical section fixed shaft gear transmission system, a second hydraulic mechanical section fixed shaft gear transmission system and an output portion. The hydraulic speed control circuit includes a hydraulic pump 2, a slippage pump 3 and a variable motor 28. The ahead and astern mechanism includes a main input shaft 8, a fourth gear 4, a seventh gear 7, a ninth gear 9, a tenth gear 10, a twelfth gear 12, a first clutch 11 and a second clutch 6. The split-collecting mechanism includes a first planet carrier 13, a twenty-third gear 23, a twenty-first gear ring 21, a second planet carrier 16, a second sun wheel 17 and a nineteenth gear 19. The hydraulic section fixed shaft gear transmission system includes a third clutch 26, a twenty-seventh gear 27, and a twenty-ninth gear 29. The first hydraulic mechanical section fixed shaft gear transmission system includes a fourth clutch 18. The second hydraulic mechanical section fixed shaft gear transmission system includes a fifth clutch 20. The output portion includes a twenty-fourth gear 24, a twenty-fifth gear 25, a thirtieth gear 30, and a main output shaft 31. The main input shaft 8 is movably connected with the casing 1, the fourth gear 4 and the second clutch 6 are fixedly disposed on a portion of the main input shaft 8 located inside the casing 1, the ninth gear 9 is rotatably disposed on the portion of the main input shaft 8 located inside the casing 1, the driving end of the second clutch 6 is in power connection with the ninth gear 9, and an end portion of the main input shaft 8 is in power connection with the slippage pump 3. A power input shaft of the hydraulic pump 2 is movably connected with the casing 1, a fifth gear 5 is fixedly disposed on a portion of the power input shaft of the hydraulic pump 2 located inside the casing 1. The fifth gear 5 is meshed with the fourth gear 4. The first planet carrier 13 is fixedly disposed at an end portion of a first half shaft, the other end of the first half shaft is movably connected with the casing 1, and a plurality of first planet gears are disposed on the first planet carrier 13. The first clutch 11 and the twelfth gear 12 are fixedly disposed on the first half shaft, the seventh gear 7 is rotatably disposed on the first half shaft, the seventh gear 7 is meshed with the fourth gear 4, the twelfth gear 12 is in power connection with the ninth gear 9 through the tenth gear 10. The driving end of the first clutch 11 is in power connection with the seventh gear 7. The three-section hydraulic mechanical stepless transmission device further includes a fourteenth gear 14. The fourteenth gear 14 is fixedly disposed at the end of a second half shaft. The other end of the second half shaft is movably connected with the casing 1. The fourteenth gear 14 is meshed with the plurality of first planet gears, the second sun wheel 17 and the fifth clutch 20 are fixedly disposed on the second half shaft. The nineteenth gear 19 is rotatably disposed on the second half shaft. The plurality of first planet gears are meshed with a fifteenth gear ring 15, the fifteenth gear ring 15 is fixedly connected with the second planet carrier 16, the second planet carrier 16 is rotatably connected with one side of each of a plurality of second planet gears, the other side of each of the plurality of second planet gears is rotatably connected with the driven end of the fourth clutch 18. The plurality of second planet gears are meshed with internal teeth of the twenty-first gear ring 21. The nineteenth gear 19 is in power connection with the fifth clutch 20 and the driving end of the fourth clutch 18.

The twenty-fifth gear 25 is fixedly disposed on a first intermediate shaft. The first intermediate shaft is movably connected with the casing 1. The twenty-fifth gear 25 is in power connection with the nineteenth gear 19 through the twenty-fourth gear 24. The third clutch 26 is fixedly disposed on the first intermediate shaft, the twenty-seventh gear 27 is rotatably disposed on the first intermediate shaft. The driven end of the third clutch 26 is in power connection with the twenty-seventh gear 27.

The hydraulic section fixed shaft gear transmission system further includes a twenty-second gear 22 and a thirty-second gear 32. The twenty-second gear 22 is fixedly disposed on a second intermediate shaft. The second intermediate shaft is movably connected with the casing 1. The twenty-second gear 22 is meshed with external teeth of the twenty-first gear ring 21. The thirty-second gear 32 is fixedly disposed in a portion of a power input shaft of the variable motor 28 located inside the casing 1. The thirty-second gear 32 is meshed with the twenty-second gear 22. The twenty-fourth gear 24 is rotatably disposed on the second intermediate shaft.

The main output shaft 31 is movably connected with the casing 1. The thirtieth gear 30 is fixedly disposed on the main output shaft 31. The thirtieth gear 30 is meshed with the twenty-fifth gear 25. A power input shaft of the variable motor 28 is movably connected with the casing 1, the twenty-ninth gear 29 is fixedly disposed on a portion of the power input shaft of the variable motor 28 located inside the casing 1. The twenty-ninth gear 29 is meshed with the twenty-seventh gear 27. The variable motor 28 and the hydraulic pump 2 form a closed hydraulic circuit.

Embodiment 3

This embodiment is an improved embodiment based on the Embodiment 1.

Figure 7:
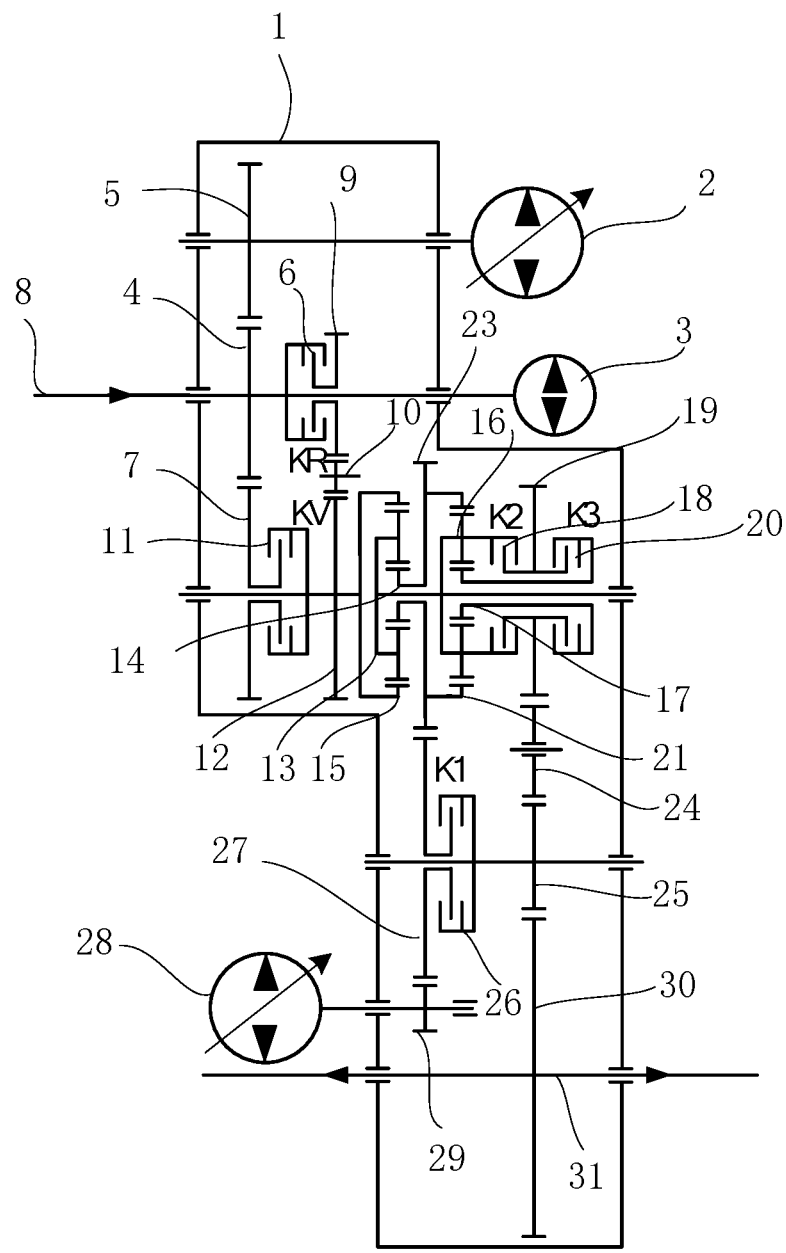
FIG. 7 is a third transmission diagram of a three-section hydraulic mechanical compound stepless transmission device.

As shown in FIG. 7, a three-section hydraulic mechanical stepless transmission device for a loader in this embodiment includes a casing 1, a hydraulic speed control circuit, an ahead and astern mechanism, a split-collecting mechanism, a hydraulic section fixed shaft gear transmission system, a first hydraulic mechanical section fixed shaft gear transmission system, a second hydraulic mechanical section fixed shaft gear transmission system and an output portion. The hydraulic speed control circuit includes a hydraulic pump 2, a slippage pump 3 and a variable motor 28. The ahead and astern mechanism includes a main input shaft 8, a fourth gear 4, a seventh gear 7, a ninth gear 9, a tenth gear 10, a twelfth gear 12, a first clutch 11 and a second clutch 6. The split-collecting mechanism includes a first planet carrier 13, a twenty-third gear 23, a twenty-first gear ring 21, a second planet carrier 16, a second sun wheel 17 and a nineteenth gear 19. The hydraulic section fixed shaft gear transmission system includes a third clutch 26, a twenty-seventh gear 27, and a twenty-ninth gear 29. The first hydraulic mechanical section fixed shaft gear transmission system includes a fourth clutch 18. The second hydraulic mechanical section fixed shaft gear transmission system includes a fifth clutch 20. The output portion includes a twenty-fourth gear 24, a twenty-fifth gear 25, a thirtieth gear 30, and a main output shaft 31. The main input shaft 8 is movably connected with the casing 1, the fourth gear 4 and the second clutch 6 are fixedly disposed on a portion of the main input shaft 8 located inside the casing 1, the ninth gear 9 is rotatably disposed on the portion of the main input shaft 8 located inside the casing 1, the driving end of the second clutch 6 is in power connection with the ninth gear 9, and an end portion of the main input shaft 8 is in power connection with the slippage pump 3. A power input shaft of the hydraulic pump 2 is movably connected with the casing 1, a fifth gear 5 is fixedly disposed on a portion of the power input shaft of the hydraulic pump 2 located inside the casing 1. The fifth gear 5 is meshed with the fourth gear 4. The first planet carrier 13 is fixedly disposed at an end portion of a first half shaft, the other end of the first half shaft is movably connected with the casing 1, and a plurality of first planet gears are disposed on the first planet carrier 13. The first clutch 11 and the twelfth gear 12 are fixedly disposed on the first half shaft, the seventh gear 7 is rotatably disposed on the first half shaft, the seventh gear 7 is meshed with the fourth gear 4, the twelfth gear 12 is in power connection with the ninth gear 9 through the tenth gear 10. The driving end of the first clutch 11 is in power connection with the seventh gear 7.

The fifteenth gear ring 15 is fixedly disposed at the end of the first half shaft, the first planet carrier 13 is fixedly disposed at the end of a third half shaft, the other end of the third half shaft is movably connected with the casing 1. The first half shaft and the third half shaft are coaxially disposed. The first planet carrier 13 is provided with a plurality of first planet gears. The plurality of first planet gears are meshed with the fifteenth gear ring 15.

The three-section hydraulic mechanical stepless transmission device further includes a fourteenth gear 14. The fourteenth gear 14 is rotatably disposed on the third half shaft. The fourteenth gear 14 is coaxially fixedly connected with the twenty-third gear 23. The fourteenth gear 14 is meshed with a plurality of first planet gears. The twenty-third gear 23 is coaxially fixedly connected with the twenty-first gear ring 21.

The second sun wheel 17, the fifth clutch 20 and the nineteenth gear 19 are rotatably disposed on the third half shaft. The second planet carrier 16 is fixedly disposed on the third half shaft, the second planet carrier 16 is rotatably connected with one side of each of a plurality of second planet gears. The other side of each of the plurality of second planet gears is rotatably connected with the driven end of the fourth clutch 18. The nineteenth gear 19 is in power connection with the fifth clutch 20 and the driving end of the fourth clutch 18.

The twenty-fifth gear 25 is fixedly disposed on a first intermediate shaft. The first intermediate shaft is movably connected with the casing 1. The twenty-fifth gear 25 is in power connection with the nineteenth gear 19 through the twenty-fourth gear 24. The third clutch 26 is fixedly disposed on the first intermediate shaft, the twenty-seventh gear 27 is rotatably disposed on the first intermediate shaft. The driven end of the third clutch 26 is in power connection with the twenty-seventh gear 27. The twenty-seventh gear 27 is meshed with external teeth of the twenty-first gear ring 21.

The main output shaft 31 is movably connected with the casing 1. The thirtieth gear 30 is fixedly disposed on the main output shaft 31. The thirtieth gear 30 is meshed with the twenty-fifth gear 25. A power input shaft of the variable motor 28 is movably connected with the casing 1, the twenty-ninth gear 29 is fixedly disposed on a portion of the power input shaft of the variable motor 28 located inside the casing 1. The twenty-ninth gear 29 is meshed with the twenty-seventh gear 27. The variable motor 28 and the hydraulic pump 2 form a closed hydraulic circuit.

Embodiment 4

This embodiment is an improved embodiment based on the Embodiment 2.

Figure 8:
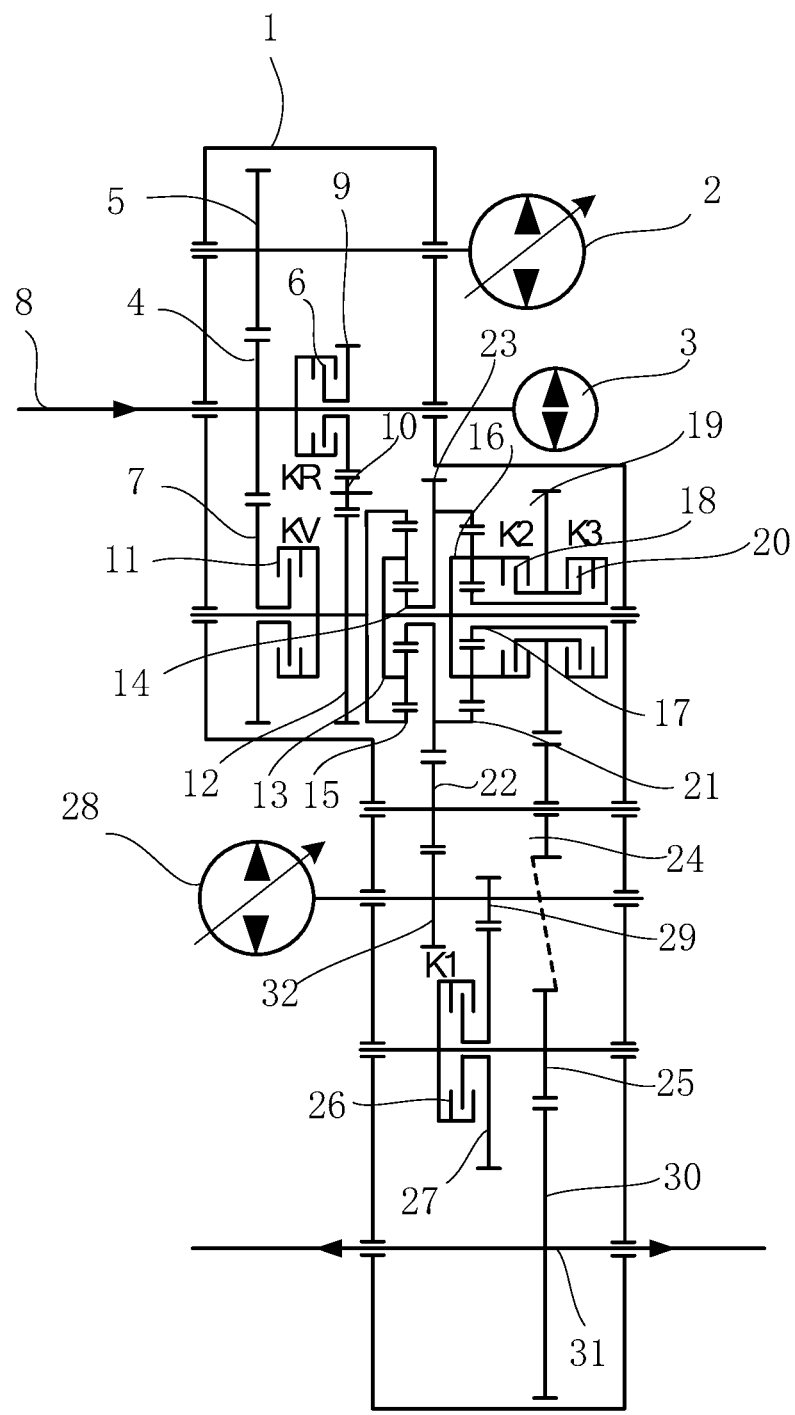
FIG. 8 is a fourth transmission diagram of a three-section hydraulic mechanical compound stepless transmission device.

As shown in FIG. 8, a three-section hydraulic mechanical stepless transmission device for a loader in this embodiment includes a casing 1, a hydraulic speed control circuit, an ahead and astern mechanism, a split-collecting mechanism, a hydraulic section fixed shaft gear transmission system, a first hydraulic mechanical section fixed shaft gear transmission system, a second hydraulic mechanical section fixed shaft gear transmission system and an output portion. The hydraulic speed control circuit includes a hydraulic pump 2, a slippage pump 3 and a variable motor 28. The ahead and astern mechanism includes a main input shaft 8, a fourth gear 4, a seventh gear 7, a ninth gear 9, a tenth gear 10, a twelfth gear 12, a first clutch 11 and a second clutch 6. The split-collecting mechanism includes a first planet carrier 13, a twenty-third gear 23, a twenty-first gear ring 21, a second planet carrier 16, a second sun wheel 17 and a nineteenth gear 19. The hydraulic section fixed shaft gear transmission system includes a third clutch 26, a twenty-seventh gear 27, and a twenty-ninth gear 29. The first hydraulic mechanical section fixed shaft gear transmission system includes a fourth clutch 18. The second hydraulic mechanical section fixed shaft gear transmission system includes a fifth clutch 20. The output portion includes a twenty-fourth gear 24, a twenty-fifth gear 25, a thirtieth gear 30, and a main output shaft 31. The main input shaft 8 is movably connected with the casing 1, the fourth gear 4 and the second clutch 6 are fixedly disposed on a portion of the main input shaft 8 located inside the casing 1, the ninth gear 9 is rotatably disposed on the portion of the main input shaft 8 located inside the casing 1, the driving end of the second clutch 6 is in power connection with the ninth gear 9, and an end portion of the main input shaft 8 is in power connection with the slippage pump 3. A power input shaft of the hydraulic pump 2 is movably connected with the casing 1, a fifth gear 5 is fixedly disposed on a portion of the power input shaft of the hydraulic pump 2 located inside the casing 1. The fifth gear 5 is meshed with the fourth gear 4. The first planet carrier 13 is fixedly disposed at an end portion of a first half shaft, the other end of the first half shaft is movably connected with the casing 1, and a plurality of first planet gears are disposed on the first planet carrier 13. The first clutch 11 and the twelfth gear 12 are fixedly disposed on the first half shaft, the seventh gear 7 is rotatably disposed on the first half shaft, the seventh gear 7 is meshed with the fourth gear 4, the twelfth gear 12 is in power connection with the ninth gear 9 through the tenth gear 10. The driving end of the first clutch 11 is in power connection with the seventh gear 7.

The fifteenth gear ring 15 is fixedly disposed at the end of the first half shaft, the first planet carrier 13 is fixedly disposed at the end of a third half shaft, the other end of the third half shaft is movably connected with the casing 1. The first half shaft and the third half shaft are coaxially disposed. The first planet carrier 13 is provided with a plurality of first planet gears. The plurality of first planet gears are meshed with the fifteenth gear ring 15.

The three-section hydraulic mechanical stepless transmission device further includes a fourteenth gear 14. The fourteenth gear 14 is rotatably disposed on the third half shaft. The fourteenth gear 14 is coaxially fixedly connected with the twenty-third gear 23. The fourteenth gear 14 is meshed with a plurality of first planet gears. The twenty-third gear 23 is coaxially fixedly connected with the twenty-first gear ring 21.

The second sun wheel 17, the fifth clutch 20 and the nineteenth gear 19 are rotatably disposed on the third half shaft. The second planet carrier 16 is fixedly disposed on the third half shaft, the second planet carrier 16 is rotatably connected with one side of each of a plurality of second planet gears. The other side of each of the plurality of second planet gears is rotatably connected with the driven end of the fourth clutch 18. The nineteenth gear 19 is in power connection with the fifth clutch 20 and the driving end of the fourth clutch 18.

The hydraulic section fixed shaft gear transmission system further includes a twenty-second gear 22 and a thirty-second gear 32. The twenty-second gear 22 is fixedly disposed on a second intermediate shaft. The second intermediate shaft is movably connected with the casing 1. The twenty-second gear 22 is meshed with the twenty-third gear 23. The thirty-second gear 32 is fixedly disposed in a portion of a power input shaft of the variable motor 28 located inside the casing 1. The thirty-second gear 32 is meshed with the twenty-second gear 22. The twenty-fourth gear 24 is rotatably disposed on the second intermediate shaft.

The main output shaft 31 is movably connected with the casing 1. The thirtieth gear 30 is fixedly disposed on the main output shaft 31. The thirtieth gear 30 is meshed with the twenty-fifth gear 25. A power input shaft of the variable motor 28 is movably connected with the casing 1, the twenty-ninth gear 29 is fixedly disposed on a portion of the power input shaft of the variable motor 28 located inside the casing 1. The twenty-ninth gear 29 is meshed with the twenty-seventh gear 27. The variable motor 28 and the hydraulic pump 2 form a closed hydraulic circuit.

Various embodiments of the disclosure may have one or more of the following effects.

(1) A mode of compounding of hydraulic and mechanical power is adopted, the hydraulic circuit only transmits part of the power, and most of the power is transmitted through the mechanical circuit, which may achieve high transmission efficiency and stepless speed change, improve operation efficiency, and/or reduce fuel consumption of the engine.

(2) A three-section continuous transmission mode is adopted, the first section is in a pure hydraulic transmission mode and is used for starting and low-speed backing of a vehicle, the advancing and vehicle backing switching only needs to change the variable direction of a hydraulic pump, to change the direction of a variable motor. No clutch is required, which may achieve smooth switching, improve operation efficiency, and/or reduce wear of clutch operating elements. The second and third sections are in a hydraulic and mechanical compound transmission mode, which may improve the transmission efficiency compared with a conventional hydraulic mechanical power shift gearbox.

(3) The stepless speed regulation of the whole process may make the engine operate at an economical rotating speed, which may improve fuel economy and reduces engine noise.

(4) Zero-speed difference switching of an inter-section clutch may be realized, and the service life of a clutch friction plate may be improved. Only one clutch is operated by inter-section switching, which may simplify the design of the gear-shifting logic and an operating system.

(5) Because of the existence of a hydraulic speed control system, the power shift may be realized. Firstly, a clutch of the next section is engaged, and then a clutch of the previous section is released to ensure the uninterrupted output of the power, which may improve the operating efficiency.

(6) Other parts are in fixed shaft gear transmission except a split-collecting mechanism, which, on the one hand, may realize the center torque drop of the input and output of the transmission device for the loader, and on the other hand, may reduce the process requirements and reduce the processing cost.

(7) Some embodiments of the disclosure may provide a three-section hydraulic mechanical compound stepless transmission device which utilizes the compounding of a hydraulic speed control circuit and a mechanical circuit. The hydraulic circuit transmits only part of power, which may achieve high transmission efficiency and stepless speed regulation, improve the transmission efficiency of the transmission device, operate an engine in an economical rotating speed range, and/or reduce the fuel consumption and noise level of a loader.

The embodiments of the disclosure are described in detail above with reference to the accompanying drawings, but the disclosure is not limited to the above embodiments. Within the knowledge of a person of ordinary skill in the art, various variations can also be made without departing from the spirit of the present invention.

Many different arrangements of the various components depicted, as well as components not shown, are possible without departing from the spirit and scope of the present disclosure. Embodiments of the present disclosure have been described with the intent to be illustrative rather than restrictive. Alternative embodiments will become apparent to those skilled in the art that do not depart from its scope. A skilled artisan may develop alternative means of implementing the aforementioned improvements without departing from the scope of the present disclosure.

It will be understood that certain features and sub combinations are of utility and may be employed without reference to other features and sub combinations and are contemplated within the scope of the claims. Unless indicated otherwise, not all steps listed in the various figures need be carried out in the specific order described.

What is claimed is:

1. A three-section hydraulic mechanical stepless transmission device for a loader, comprising:
    a casing, a hydraulic speed control circuit, an ahead and astern mechanism, a split-collecting mechanism, a hydraulic section fixed shaft gear transmission system, a first hydraulic mechanical section fixed shaft gear transmission system, a second hydraulic mechanical section fixed shaft gear transmission system, and an output portion;
    wherein:
        the hydraulic speed control circuit comprises a hydraulic pump, a slippage pump, and a variable motor;
        the ahead and astern mechanism comprises a main input shaft, a fourth gear, a seventh gear, a ninth gear, a tenth gear, a twelfth gear, a first clutch, and a second clutch;
        the split-collecting mechanism comprises a first planet carrier, a twenty-third gear, a twenty-first gear ring, a second planet carrier, a second sun wheel, and a nineteenth gear;
        the hydraulic section fixed shaft gear transmission system comprises a third clutch, a twenty-seventh gear, and a twenty-ninth gear;
        the first hydraulic mechanical section fixed shaft gear transmission system comprises a fourth clutch;
        the second hydraulic mechanical section fixed shaft gear transmission system comprises a fifth clutch;
        the output portion comprises a twenty-fourth gear, a twenty-fifth gear, a thirtieth gear, and a main output shaft;
        the main input shaft is movably connected with the casing;
        the fourth gear and the second clutch are fixedly disposed on a portion of the main input shaft located inside the casing;
        the ninth gear is rotatably disposed on the portion of the main input shaft located inside the casing;
        a driving end of the second clutch is in power connection with the ninth gear;
        an end portion of the main input shaft is in power connection with the slippage pump;
        a power input shaft of the hydraulic pump is movably connected with the casing;
        a fifth gear is meshed with the fourth gear and fixedly disposed on a portion of the power input shaft of the hydraulic pump located inside the casing;
        the first planet carrier is fixedly disposed at an end portion of a first half shaft, the other end of the first half shaft is movably connected with the casing;
        a plurality of first planet gears are disposed on the first planet carrier;
        the first clutch and the twelfth gear are fixedly disposed on the first half shaft;
        the seventh gear is meshed with the fourth gear and rotatably disposed on the first half shaft;
        the twelfth gear is in power connection with the ninth gear through the tenth gear;
        the driving end of the first clutch is in power connection with the seventh gear;

the three-section hydraulic mechanical stepless transmission device further comprises a fourteenth gear, fixedly disposed at the end of a second half shaft, and the other end of the second half shaft is movably connected with the casing;

the fourteenth gear is meshed with the plurality of first planet gears;

the second sun wheel and the fifth clutch are fixedly disposed on the second half shaft;

the nineteenth gear is rotatably disposed on the second half shaft;

the plurality of first planet gears are meshed with a fifteenth gear ring, the fifteenth gear ring is fixedly connected with the second planet carrier, the second planet carrier is rotatably connected with one side of each of a plurality of second planet gears, the other side of each of the plurality of second planet gears is rotatably connected with the driven end of the fourth clutch;

the plurality of second planet gears are meshed with internal teeth of the twenty-first gear ring;

the nineteenth gear is in power connection with the fifth clutch and the driving end of the fourth clutch;

the twenty-fifth gear is fixedly disposed on a first intermediate shaft movably connected with the casing;

the twenty-fifth gear is in power connection with the nineteenth gear through the twenty-fourth gear;

the third clutch is fixedly disposed on the first intermediate shaft;

the twenty-seventh gear is meshed with external teeth of the twenty-first gear ring and rotatably disposed on the first intermediate shaft;

the driven end of the third clutch is in power connection with the twenty-seventh gear;

the main output shaft is movably connected with the casing;

the thirtieth gear is meshed with the twenty-fifth gear and fixedly disposed on the main output shaft;

a power input shaft of the variable motor is movably connected with the casing;

the twenty-ninth gear is meshed with the twenty-seventh gear and fixedly disposed on a portion of the power input shaft of the variable motor located inside the casing; and the variable motor and the hydraulic pump form a closed hydraulic circuit.

2. The three-section hydraulic mechanical stepless transmission device for the loader according to claim 1, wherein:

the hydraulic section fixed shaft gear transmission system further comprises a twenty-second gear and a thirty-second gear;

the twenty-second gear is fixedly disposed on a second intermediate shaft movably connected with the casing;

the twenty-second gear is meshed with external teeth of the twenty-first gear ring;

the thirty-second gear is fixedly disposed on a portion of the power input shaft of the variable motor located inside the casing; and the thirty-second gear is meshed with the twenty-second gear.

3. The three-section hydraulic mechanical stepless transmission device for the loader according to claim 2, wherein the twenty-fourth gear is rotatably disposed on the second intermediate shaft.

4. The three-section hydraulic mechanical stepless transmission device for the loader according to claim 1, wherein:

the fifteenth gear ring is fixedly disposed at an end portion of a first half shaft, and the other end of the first half shaft is movably connected with the casing;

the first planet carrier is fixedly disposed at the end of a third half shaft, and the other end of the third half shaft is movably connected with the casing;

the first half shaft and the third half shaft are coaxially disposed;

the first planet carrier is provided with a plurality of first planet gears, meshed with the fifteenth gear ring;

the three-section hydraulic mechanical stepless transmission device further comprises a fourteenth gear rotatably disposed on the third half shaft;

the fourteenth gear is coaxially fixedly connected with the twenty-third gear and meshed with a plurality of first planet gears;

the twenty-third gear is coaxially fixedly connected with the twenty-first gear ring;

the second sun wheel, the fifth clutch, and the nineteenth gear are rotatably disposed on the third half shaft;

the second planet carrier is fixedly disposed on the third half shaft;

the second planet carrier is rotatably connected with one side of each of a plurality of second planet gears, and the other side of each of the plurality of second planet gears is rotatably connected with the driven end of the fourth clutch; and the nineteenth gear is in power connection with the fifth clutch and the driving end of the fourth clutch.

5. The three-section hydraulic mechanical stepless transmission device for the loader according to claim 4, wherein:

the hydraulic section fixed shaft gear transmission system further comprises a twenty-second gear and a thirty-second gear;

the twenty-second gear is fixedly disposed on a second intermediate shaft movably connected with the casing;

the twenty-second gear is meshed with the twenty-third gear;

the thirty-second gear is fixedly disposed on a portion of the power input shaft of the variable motor located inside the casing; and the thirty-second gear is meshed with the twenty-second gear.

6. The three-section hydraulic mechanical stepless transmission device for the loader according to claim 5, wherein the twenty-fourth gear is rotatably disposed on the second intermediate shaft.

* * * * *